United States Patent
Cha et al.

(10) Patent No.: US 8,573,660 B2
(45) Date of Patent: Nov. 5, 2013

(54) SAFETY APPARATUS OF REAR BUMPER STORAGE BOX FOR VEHICLE

(75) Inventors: Dong Eun Cha, Seongnam-si (KR); Seung Mok Lee, Gunpo-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/493,604

(22) Filed: Jun. 11, 2012

(65) Prior Publication Data

US 2013/0147214 A1 Jun. 13, 2013

(30) Foreign Application Priority Data

Dec. 8, 2011 (KR) ........................ 10-2011-0130855

(51) Int. Cl.
*B60R 99/00* (2009.01)

(52) U.S. Cl.
USPC ......................................... 293/106; 224/489

(58) Field of Classification Search
USPC ......... 296/37.1, 37.6; 293/106; 224/489, 490, 224/512
See application file for complete search history.

(56) References Cited

U.S. PATENT DOCUMENTS

| | | | | |
|---|---|---|---|---|
| 6,474,715 | B2 * | 11/2002 | Fukushima et al. | 296/37.1 |
| 6,601,895 | B1 * | 8/2003 | Tannenbaum et al. | 296/26.09 |
| 6,644,707 | B2 * | 11/2003 | McLaughlin et al. | 296/26.09 |
| 6,926,326 | B2 * | 8/2005 | Iyoda et al. | 293/149 |
| 8,256,807 | B2 * | 9/2012 | Lucas | 293/106 |
| 8,356,852 | B2 * | 1/2013 | Lucas et al. | 296/37.1 |
| 2001/0022450 | A1 * | 9/2001 | Delavalle et al. | 296/37.1 |
| 2005/0140159 | A1 * | 6/2005 | Barber | 296/37.6 |
| 2006/0049731 | A1 * | 3/2006 | Choi et al. | 312/330.1 |

* cited by examiner

*Primary Examiner* — Lori Lyjak
(74) *Attorney, Agent, or Firm* — Morgan, Lewis & Bockius LLP

(57) ABSTRACT

A safety apparatus of a rear bumper storage box for a vehicle includes a storage box that does not rotate upward but rotates downward toward a ground surface when a rear low-speed collision accident occurs.

9 Claims, 3 Drawing Sheets

SAFETY APPARATUS OF REAR BUMPER STORAGE BOX FOR VEHICLE

CROSS-REFERENCE TO RELATED APPLICATION

The present application claims priority of Korean Patent Application Number 10-2011-0130855 filed Dec. 8, 2011, the entire contents of which application is incorporated herein for all purposes by this reference.

BACKGROUND OF INVENTION

1. Field of Invention

The present invention relates to a safety apparatus of a rear bumper storage box for a vehicle, and more particularly, to a safety apparatus of a rear bumper storage box for a vehicle, and more particular, to a safety apparatus of a rear bumper storage box a for a vehicle that can prevent a tail gate or a trunk lead from being damaged by the storage box at a rear collision accident and furthermore, maximally prevent an injury caused by broken pieces generated when the storage box is broken.

2. Description of Related Art

FIGS. 1 to 3 show a storage box capable of storing articles by using an internal space of a vehicle rear bumper corresponding to a spare space.

That is, a storage box 3 is installed in an internal space 2 of a rear bumper 1 corresponding to a spare space of a vehicle. The storage box 3 includes a lower tray 4 having a space capable of storing an article, a tray cover 6 rotatably coupled to the lower tray 4 through a link member 5, and a support tray 7 coupled onto the bottom of the lower tray 4 to support the lower tray 4.

Herein, the tray cover 6 is integrally coupled with a bumper door 8 and the bumper door 8 is formed by cutting a part of the rear bumper 1. As shown in FIGS. 1 and 2, the bumper door 8 serves as the rear bumper 1 while the tray cover 6 seals the lower tray 4.

Therefore, when an operator rotates the tray cover 6 rearward, the lower tray 4 is opened, and as a result, a required article is stored in the opened lower tray 4.

However, since the storage box 3 does not have a safety apparatus against a rear low-speed collision, a high-price vehicle component is damaged by the storage box 3.

That is, when the rear low-speed collision accident occurs, the storage box 3 is pushed into the front side as marked with an arrow M1 shown in FIG. 3 by collision energy generated while collision and when the storage box 3 which is pushed into the front side is resisted by a rear end panel 9, the storage box 3 rotates upward as marked with an arrow R1 from that time.

When the storage box 3 rotates upward at the rear low-speed collision accident, a tail gate 10 or a trunk lead positioned above the storage box 3 is damaged by the storage box 3, and as a result, the tail gate 10 or the trunk lead having a comparatively large repairing expense are damaged.

Further, when the storage box 3 is damaged while rotating upward, as broken pieces of the storage box 3 are scattered around, a person positioned around the vehicle is injured.

Reference numeral 11 shown in FIGS. 2 and 3 represents a rear floor panel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a safety apparatus of a rear bumper storage box for a vehicle that can prevent a tail gate or a trunk lead from being damaged by the storage box provided in a rear bumper at a rear collision accident and furthermore, maximally prevent a person from being injured by a broken storage box.

Various aspects of the present invention provide for a safety apparatus of a rear bumper storage box for a vehicle, including a store panel configured to be integrally connected with a vehicle body panel and a rear end having a rear end that protrudes toward the storage box provided in the internal space, and a storage box protrusion integrally on the bottom of the storage box to protrude in an direction facing the stopper panel to restrain upward rotation of the storage box in contact with the stopper box when a rear low-speed collision accident occurs.

The stopper panel may include an upper stopper panel positioned below a rear end panel and installed to be integrally connected with the vehicle body panel, and a lower stopper panel positioned below the upper stopper panel to be spaced apart from the upper stopper panel by a predetermined gap and installed to be integrally connected with the vehicle body panel.

The storage box protrusion may include an upper protrusion restraining the upward rotation of the storage box as the storage box is pushed into the front side as the storage box is in close contact with the bottom of the supper stopper panel, and a lower protrusion positioned below the upper protrusion and restraining the upward rotation of the storage box as the storage box is in close contact with the bottom of the lower store panel when the storage box is pushed into the front side.

The upper stopper panel may be made of steel having rigidity to endure an impact load by the storage box and prevent an appearance from being changed when the storage box is pushed into the front side to hit the upper stopper panel.

The lower stopper panel may be made of plastic in which the appearance is changed and bent or fractured by the impact load caused by the storage box when the storage box is pushed into the front side to hit the lower stopper panel.

The storage box may includes a lower tray having a space capable of storing an article, a tray cover rotatably coupled to the lower tray through a link member, and a support tray coupled onto the bottom of the lower tray to support the lower tray.

The tray cover may be integrally coupled with a bumper door cut in the rear bumper.

The storage box protrusion may be integrally provided in the support tray.

The vehicle body panel connected with the stopper panel may be a rear floor panel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
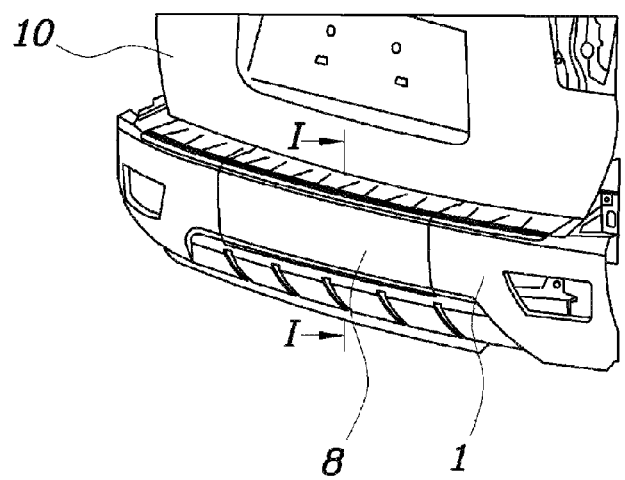
FIG. 1 is a perspective of a vehicle in the related art where a storage box is provided in a rear bumper.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In various embodiments of the present invention, a storage box 3 is installed in an internal space 2 of a rear bumper 1 corresponding to a spare space of a vehicle. The storage box 3 includes a lower tray 4 having a space capable of storing an article, a tray cover 6 rotatably coupled to the lower tray 4 through a link member 5, and a support tray 7 coupled onto the bottom of the lower tray 4 to support the lower tray 4.

Figure 2:
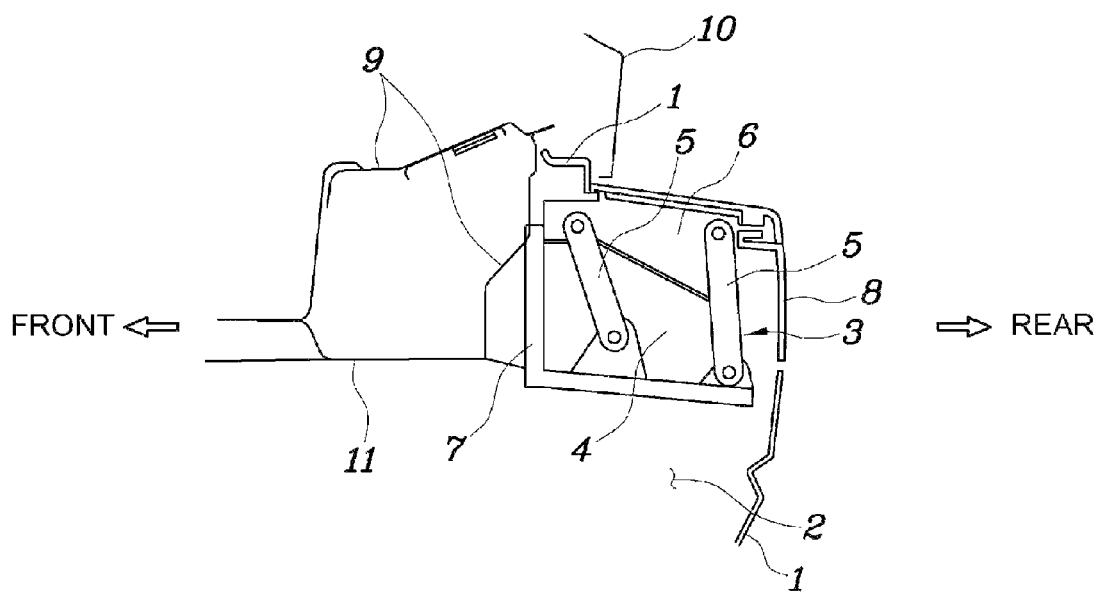
FIG. 2 is a cross-sectional view taken along line I-I of FIG. 1.
Figure 3:
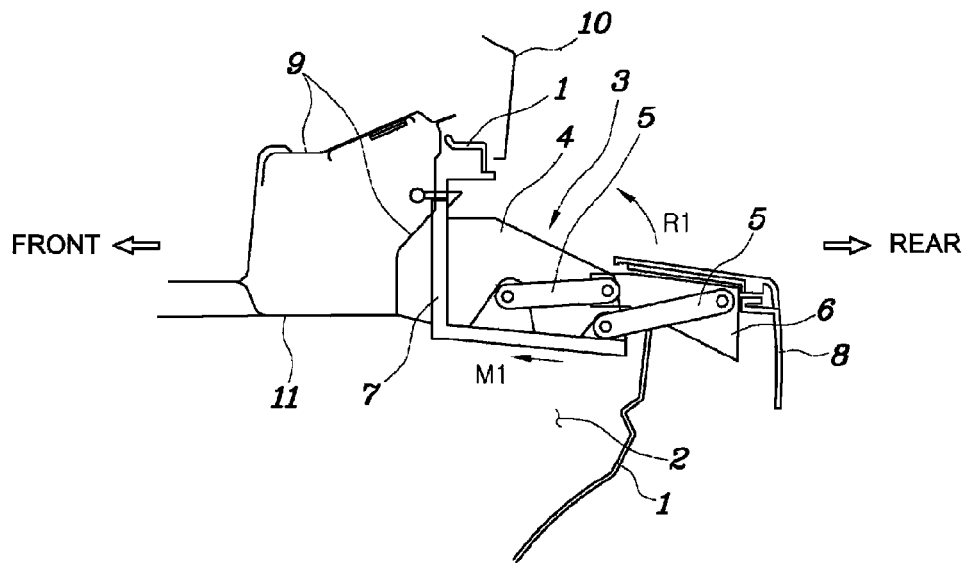
FIG. 3 is a diagram showing a state in which a tray cover rotates rearward from a state of FIG. 2.

Herein, the tray cover 6 is integrally coupled with a bumper door 8 and the bumper door 8 is formed by cutting a part of the rear bumper 1. As shown in FIG. 2, the bumper door 8 serves as the rear bumper 1 while the tray cover 6 seals the lower tray 4.

Meanwhile, the safety apparatus of a rear bumper storage box for a vehicle according to various embodiments of the present invention includes a store panel 20 configured to be integrally connected with a vehicle body panel and a rear end having a rear end that protrudes toward the storage box 3 provided in the internal space 2 and a storage box protrusion 30 integrally on and/or monolithically formed with the bottom of the storage box 3 to protrude in an direction facing the stopper panel 20 to restrain upward rotation of the storage box 3 in contact with the stopper box 20 when a rear low-speed collision accident occurs.

Herein, the stopper panel 20 includes an upper stopper panel 21 positioned below a rear end panel 9 and installed to be integrally connected with the vehicle body panel and a lower stopper panel 22 positioned below the upper stopper panel 21 to be spaced apart from the upper stopper panel 21 by a predetermined gap and installed to be integrally connected with the vehicle body panel.

In addition, the storage box protrusion 30 includes an upper protrusion 31 restraining the upward rotation of the storage box 3 as the storage box 3 is pushed into the front side as the storage box 3 is in close contact with the bottom of the supper stopper panel 21 and a lower protrusion 32 positioned below the upper protrusion 31 and restraining the upward rotation of the storage box 3 as the storage box 3 is in close contact with the bottom of the lower store panel 22 when the storage box 3 is pushed into the front side.

The upper stopper panel 21 may be made of steel having rigidity to endure an impact load by the storage box 3 and prevent an appearance from being changed when the storage box 3 is pushed into the front side to hit the upper stopper panel 21.

The lower stopper panel 22 may be made of plastic in which the appearance is changed and bent or fractured by the impact load caused by the storage box 3 when the storage box 3 is pushed into the front side to hit the lower stopper panel 22.

That is, the upper stopper panel 21 may be made of steel to have sufficient rigidity and the lower stopper panel 22 may be made of a material which easily collapses by the hitting of the storage box 3. Therefore, the upward rotation of the storage box 3 can be prevented at the rear low-speed collision accident, and as a result, the tail gate 10 or the trunk lead can be prevented from being damaged and the injury by the broken pieces of the storage box 3 can be prevented.

Meanwhile, the storage box protrusion 30 is integrally provided in and/or monolithically formed with the support tray 7 configuring the storage box 3 and the vehicle body panel connected with the stopper panel 20 is the rear floor panel 11.

Hereinafter, an operation of the protective device of an automobile driver according to various embodiments of the present invention will be described.

Figure 4:
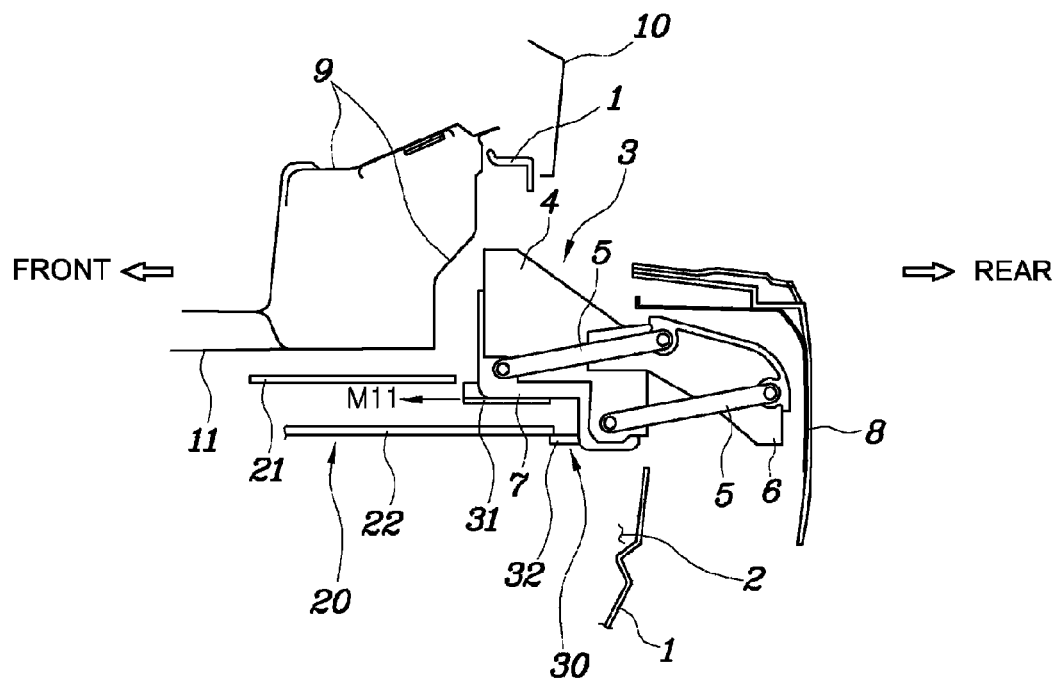
FIG. 4 is a diagram showing an exemplary safety apparatus of a rear bumper storage box for a vehicle according to the present invention.

As described in FIG. 4, the tray cover 6 rotates rearward through the link member 5 to open the lower tray 4 and when the rear low-speed collision occurs in the normal storage box 3 of the rear bumper capable of storing the article in the opened lower tray 4, the storage box 3 is pushed into the front side as marked with an arrow M11 by the collision energy generated at that time.

Figure 5:
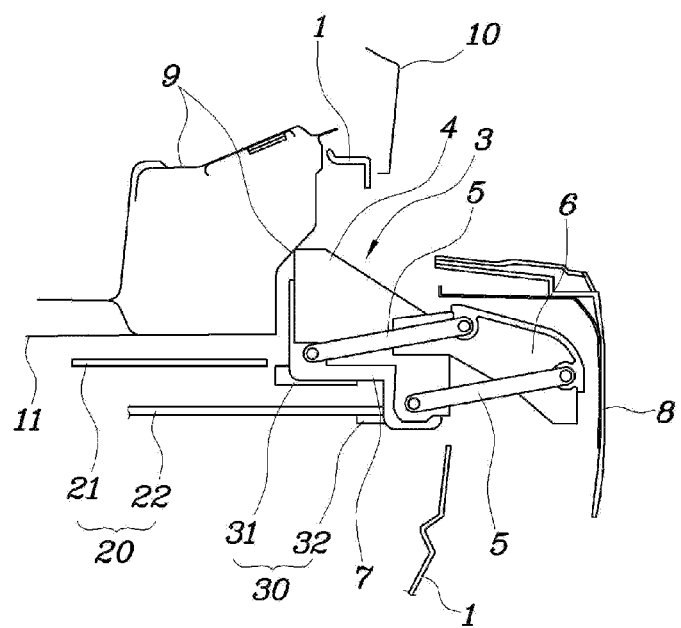
FIGS. 5 and 6 are diagrams for describing an operating process of an exemplary safety apparatus when a rear low-speed collision accident occurs.

Then, the upper protrusion 31 provided in the storage box 3 is in close contact with the bottom of the upper stopper panel 21 as shown in FIG. 5 and simultaneously, the lower protrusion 32 provided in the storage box 3 is in close contact with the bottom of the lower stopper panel 22.

As described above, when the upper protrusion 31 is in close contact with the bottom of the upper stopper panel 21 and the lower protrusion 32 is in close contact with the bottom of the lower stopper panel 22, the storage box 3 cannot rotate upward by restraining force between the upper protrusion 31 and the upper stopper panel 21 and restraining force between the lower protrusion 32 and the lower stopper panel 22.

Figure 6:
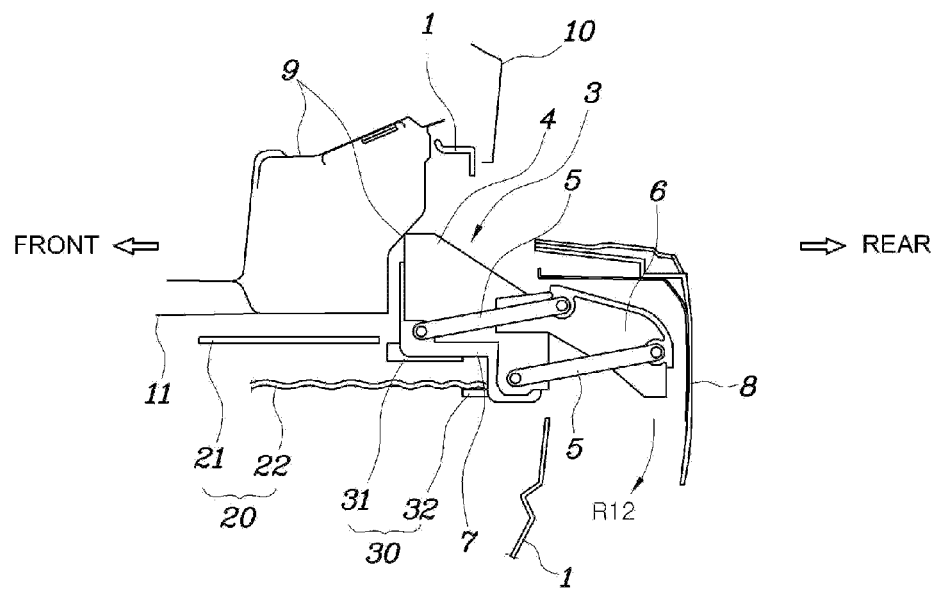

When the storage box 3 is further pushed into the front side by continued collision energy in the state shown in FIG. 5, the upper stopper panel 21 is made of steel having sufficient rigidity, and as a result, a front pushing amount of the storage box 3 is sufficiently supported while the upper stopper panel 21 maintains a shape thereof as it is, but since the lower stopper panel 22 is made of plastic, the shape is deformed as shown in FIG. 6 or the upper stopper panel 21 is broken in severe case.

Then, holding force of the storage box 3 is removed by the lower stopper panel 22, and as a result, the storage box 3 rotates downward toward the ground surface as marked with an arrow R11 shown around a contact point with the upper stopper panel 21.

As described above, when the storage box 3 does not rotate upward but rotates downward toward the ground surface at the rear low-speed collision accident, the tail gate 10 or the trunk lead can be prevented from being damaged and broken by the storage box 3 and furthermore, even though the storage box 3 is broken, the person can maximally prevented from being injured by the broken pieces of the storage box 3.

However, when the storage box 3 rotates downward toward the ground surface, the rear bumper 1 may be broken and damaged by the storage box 3, but since the rear bumper 1 is already broken or damaged at the rear low-speed collision accident, the broken and damaged rear bumper 1 by the storage box 3 is not a large problem and the tail gate 10 or the trunk lead having a larger repairing expense than the rear bumper 1 can be prevented from being damaged and broken, thereby significantly reducing the repairing expense of the vehicle.

Meanwhile, in the safety apparatus according to various embodiments of the present invention, the state in which the tray cover 6 rotates rearward from the lower tray 4, that is, the state in which the storage box 3 is opened is shown an example, but the same operation can be performed even when the storage box 3 is sealed.

Further, of course, the safety apparatus according to various embodiments of the present invention can be similarly applied to even a structure in which the storage box 3 is opened while sliding rearward from the vehicle.

According to the safety apparatus of a rear bumper storage box of various embodiments of the present invention, as the storage box does not rotate upward but rotates downward toward a ground surface when a rear low-speed collision accident occurs, the tail gate or the trunk lead can be prevented from being damaged and broken by the storage box and furthermore, the persons can be maximally injured by the broken pieces of the storage box when the storage box is broken.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A safety apparatus of a rear bumper storage box for a vehicle, comprising:
    a stopper panel mounted on a vehicle body panel and a rear end having a rear end that protrudes toward the storage box provided in an internal space; and
    a storage box protrusion integrally connected with the bottom of the storage box to protrude in an direction facing the stopper panel to restrain upward rotation of the storage box in contact with the stopper box when a rear low-speed collision accident occurs.

2. The safety apparatus of the rear bumper storage box for the vehicle of claim 1, wherein the stopper panel includes:
    an upper stopper panel positioned below a rear end panel and integrally connected with the vehicle body panel; and
    a lower stopper panel positioned below the upper stopper panel and spaced apart from the upper stopper panel by a predetermined gap and integrally connected with the vehicle body panel.

3. The safety apparatus of the rear bumper storage box for the vehicle of claim 2, wherein the storage box protrusion includes:
    an upper protrusion restraining the upward rotation of the storage box as the storage box is pushed into the front side as the storage box is in close contact with the bottom of the upper stopper panel; and
    a lower protrusion positioned below the upper protrusion and restraining the upward rotation of the storage box as the storage box is in close contact with the bottom of the lower stopper panel when the storage box is pushed into the front side.

4. The safety apparatus of the rear bumper storage box for the vehicle of claim 2, wherein the upper stopper panel is made of steel having rigidity to endure an impact load by the storage box and prevent an appearance from being changed when the storage box is pushed into the front side to hit the upper stopper panel.

5. The safety apparatus of the rear bumper storage box for the vehicle of claim 2, wherein the lower stopper panel is made of plastic in which the appearance is changed and bent or fractured by the impact load caused by the storage box when the storage box is pushed into the front side to hit the lower stopper panel.

6. The safety apparatus of the rear bumper storage box for the vehicle of claim 1, wherein the storage box includes:
    a lower tray having a space capable of storing an article;
    a tray cover rotatably coupled to the lower tray through a link member; and
    a support tray coupled onto the bottom of the lower tray to support the lower tray.

7. The safety apparatus of the rear bumper storage box for the vehicle of claim 6, wherein the tray cover is integrally coupled with a bumper door cut in the rear bumper.

8. The safety apparatus of the rear bumper storage box for the vehicle of claim 6, wherein the storage box protrusion is integrally provided in the support tray.

9. The safety apparatus of the rear bumper storage box for the vehicle of claim 1, wherein the vehicle body panel connected with the stopper panel is a rear floor panel.

* * * * *